(12) United States Patent
Leet

(10) Patent No.: US 11,301,650 B2
(45) Date of Patent: Apr. 12, 2022

(54) MANAGING TAG NOMENCLATURE IN A NETWORKED ENVIRONMENT

(71) Applicant: INTELLIGRATED HEADQUARTERS, LLC, Mason, OH (US)

(72) Inventor: William Alexander Leet, Mason, OH (US)

(73) Assignee: INTELLIGRATED HEADQUARTERS, LLC, Mason, OH (US)

(*) Notice: Subject to any disclaimer, the term of this patent is extended or adjusted under 35 U.S.C. 154(b) by 164 days.

(21) Appl. No.: 16/866,945

(22) Filed: May 5, 2020

(65) Prior Publication Data

US 2021/0350094 A1 Nov. 11, 2021

(51) Int. Cl.
*G06K 7/10* (2006.01)
*G06F 16/28* (2019.01)
*G01K 13/00* (2021.01)
*G06Q 10/08* (2012.01)

(52) U.S. Cl.
CPC ......... *G06K 7/10366* (2013.01); *G01K 13/00* (2013.01); *G06F 16/285* (2019.01); *G06F 16/288* (2019.01); *G06Q 10/0875* (2013.01)

(58) Field of Classification Search
None
See application file for complete search history.

(56) References Cited

U.S. PATENT DOCUMENTS

| 5,673,037 A * | 9/1997 | Cesar ................. G06K 7/10039 340/10.32 |
| 9,547,316 B2 | 1/2017 | Shilts et al. |
| 9,734,470 B2 * | 8/2017 | Rajappa ................. G06Q 10/06 |
| 2014/0241354 A1 | 8/2014 | Rahman et al. |

FOREIGN PATENT DOCUMENTS

WO 2015/012574 A1 1/2015

* cited by examiner

*Primary Examiner* — Kristy A Haupt
(74) *Attorney, Agent, or Firm* — Alston & Bird LLP

(57) ABSTRACT

Some example embodiments described herein relates to a system for configuring a tag name of an electronic component. The system can include a processor that can obtain a dataset comprising a plurality of tags, where each tag can be associated with an electronic component. Further, the processor can identify a metadata associated with the plurality of tags. Further, the processor can recognize a set of tags from amongst the plurality of tags that exhibit a common relationship. The common relationship can be indicative of at least one of: a pattern, a behavior, a usage type, and an installation location, corresponding to the set of tags. Further, the processor can generate a tag nomenclature for the set of tags and configure a tag name of the plurality of tags based on the tag nomenclature.

20 Claims, 8 Drawing Sheets

MANAGING TAG NOMENCLATURE IN A NETWORKED ENVIRONMENT

TECHNOLOGICAL FIELD

Example embodiments described herein relate generally to systems, methods, and apparatuses for managing nomenclature of tags in a networked environment, and, more particularly, to configuring a tag name of an electronic component based on a tag nomenclature.

BACKGROUND

In an industrial environment, many electronic components such as, but not limited to, imaging devices, cameras, handheld devices, portable data terminals, barcode scanners, RFID readers, mobile devices, smartphones, laptops, programmable logic controllers (PLCs), servo motors, sensors, photo eyes, variable frequency drives, and/or the like, are used to perform various operations. In some example industrial establishments, these electronic components can be connected over a network (e.g. a communication network) and can exchange various types of data amongst each other. Generally, these electronic components are identified by unique identifiers known as tags. Said differently, each of these electronic components can have a tag name by which these components can be universally addressed within the networked environment. Typically, the tag names of these electronic devices can be standardized based on a defined protocol or proprietary of an institution (e.g. a business entity).

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Some example embodiments described herein relates to a system for configuring a tag name of an electronic component. The system includes a processor that can be configured to obtain a dataset comprising a plurality of tags. In this regard, each tag of the plurality of tags can be associated with an electronic component. The processor can be configured to identify a metadata associated with the plurality of tags. Further, the processor can be configured to recognize a set of tags from amongst the plurality of tags that exhibit a common relationship. The processor can recognize the set of tags by analyzing the metadata based on a pre-defined rule. In this regard, the relationship can be indicative of at least one of: a pattern, a behavior, a usage type, and an installation location, corresponding to the set of tags. Further, the processor can be configured to generate a tag nomenclature for the set of tags and configure a tag name of the plurality of tags based on the tag nomenclature.

In some example embodiments, the plurality of tags can include at least one of: a sensor tag, a variable frequency drive (VFD) tag, or a programmable logic controller (PLC) tag.

In some example embodiments, each tag of the plurality of tags can be associated with at least one of: the electronic component and a data entity associated with the electronic component. In this regard, in some examples, the plurality of tags can be used to perform communication based on one of: an open proprietary communication (OPC) and open standard communication protocol (OSP).

In an example embodiment, the sensor tag can correspond to a tag associated with one of: a photo eye, a temperature sensor, and an input/output sensor connected over a network.

According to some example embodiments, the processor can be configured to recognize a set of photo eye tags of a sorter system from amongst the plurality of tags exhibiting the common relationship based on using at least one of: a cycle count for a test run of carts, a duration of blocking of a timing sensor, a bill of material data, and a timing to approximate location on a conveyor line.

In some example embodiments, the processor can be configured to recognize a set of temperature sensor tags based on using at least one of: a trend indicative of a first predetermined gain and a second predetermined dissipation, in temperature values sensed by the temperature sensor, and a bill of material data.

In some example embodiments, the processor can be configured to recognize a set of input/output sensor tags based on using at least one of: a parameterization data associated with the input/output sensor tags and an OPC based standardized data format used in communication.

According to some example embodiments, the processor can be configured to recognize a set of VFD tags based on identifying a pattern in at least one of: a power value, an energy value, a voltage value, a current value, and a bill of material data, associated with the VFD.

Some example embodiments described herein relates to a method of configuring a tag name of an electronic component. The method can include obtaining a dataset comprising a plurality of tags. In this regard, each tag of the plurality of tags can be associated with an electronic component. The method can further include identifying a metadata associated with the plurality of tags. Further, the method can include recognizing a set of tags from amongst the plurality of tags that exhibit a common relationship, by analyzing the metadata based on a pre-defined rule. In this regard, the relationship can be indicative of at least one of: a pattern, a trend, a usage type, and an installation location, corresponding to the set of tags. Further, the method can include generating a tag nomenclature for the set of tags. Furthermore, the method can include configuring a tag name of the plurality of tags based on the tag nomenclature.

According to some example embodiments, the method can further include recognizing a set of photo eye tags of a sorter system from amongst the plurality of tags exhibiting the common relationship based on using at least one of: a cycle count for a test run of carts, duration of blocking of a timing sensor, a bill of material data, and a timing to approximate location on a conveyor line. Further, the method can include recognizing a set of temperature sensor tags based on using at least one of: a trend indicative of a first predetermined gain in and a second predetermined dissipation, in temperature values sensed by the temperature sensor, and a bill of material data. Furthermore, the method can include recognizing a set of input/output sensor tags based on using at least one of: a parameterization data associated with the input/output sensor tags and an OPC based standardized data format used in communication.

In some example embodiments, the method can include recognizing a set of VFD tags based on identifying a pattern in at least one of: a power value, an energy value, a voltage value, a current value, and a bill of material data associated with the VFD.

Some example embodiments described herein relates to a non-transitory computer readable medium. The non-transitory computer readable medium can store thereon computer-executable instructions that in response to execution by a processor can perform operations. The operations can include obtaining a dataset comprising a plurality of tags. In this regard, each tag of the plurality of tags can be associated with an electronic component. The operations can further include identifying a metadata associated with the plurality of tags. Further, the operations can include recognizing a set of tags from amongst the plurality of tags that exhibit a common relationship, by analyzing the metadata based on a pre-defined rule. In this regard, the relationship can be indicative of at least one of: a pattern, a trend, a usage type, and an installation location, corresponding to the set of tags. Further, the operations can include generating a tag nomenclature for the set of tags. Furthermore, the operations can include configuring a tag name of the plurality of tags based on the tag nomenclature.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
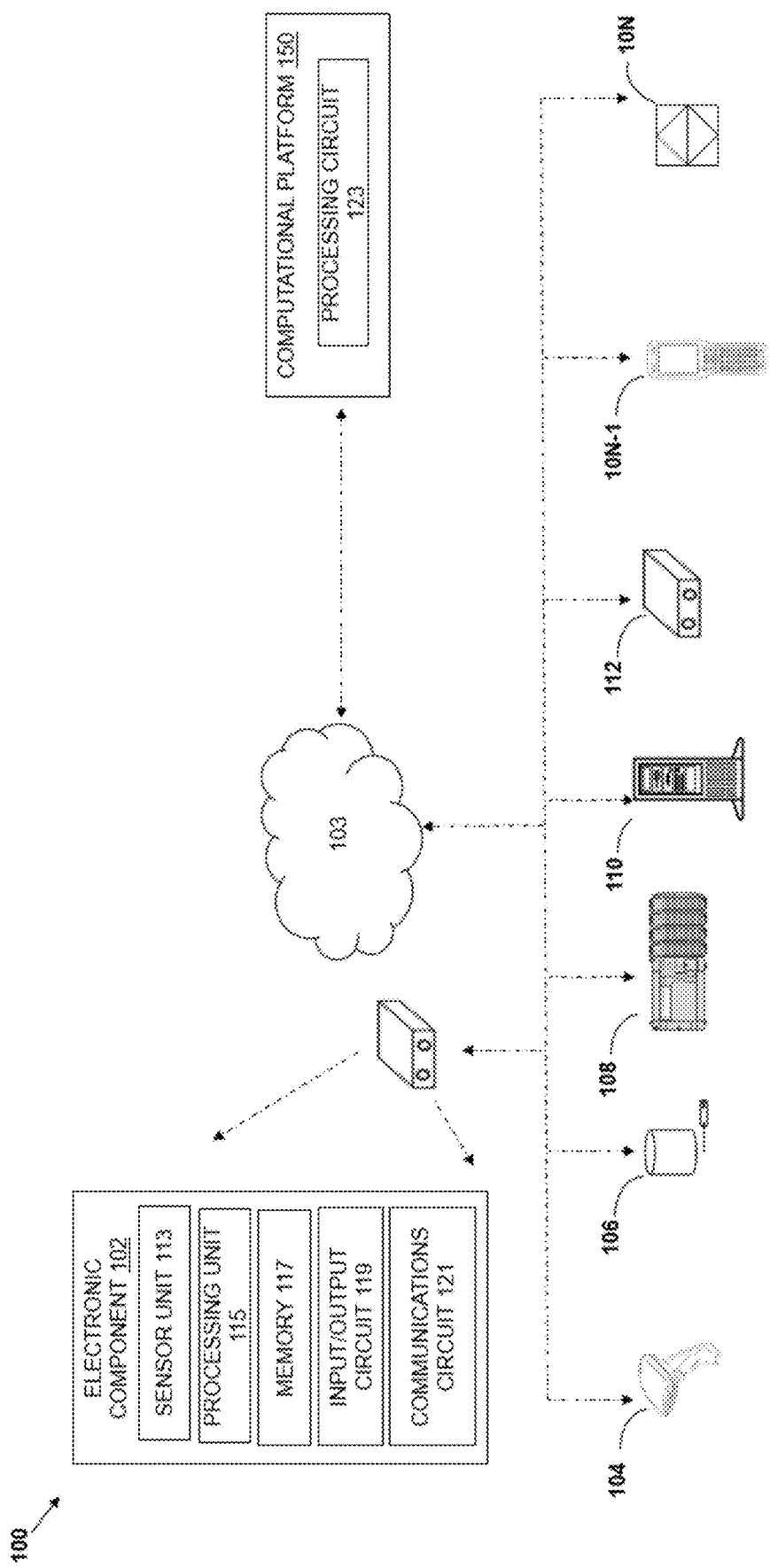
FIG. 1 illustrates a schematic view of a system for configuration of a tag of an electronic component, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

The term "electronic component" is used hereinafter, to refer to any physical component that can include, for example, an electronic circuitry, an electronic terminal, and/or the like. In accordance with some examples, the electronic component referred hereinafter can correspond to any passive, active, or electro-mechanical electronic component that can perform electrical operations by using electrical connections. For instance, the electronic component can correspond to any of, a sensor, a variable frequency drive, an input/output peripheral, a programmable logic controller (PLCs), a programmable automation controller (PACs), an industrial computer, a desktop computer, a personal data assistant (PDAs), a laptop computer, a tablet computer, a personal computer, a barcode reader, a scanner, an indicia reader, an imager, a Radio-frequency identification (RFID readers or interrogators) component, a vehicle-mounted computer, a wearable barcode scanner, a wearable indicia reader, a point of sale (POS) terminal, a headset, an electrical switchgear, a vision system, a servo drive, a feedback device, an optical encoder, a magnetic encoder, a resolver, a hall effect sensor, an actuator, a stepper motors with integrated drive or sensors, a compressed air system, and similar electronic devices that can configured to perform the various operations. In some examples, the electronic component can correspond to a component that can be used in an industrial environment (e.g. a material handling environment including sorters, conveyors, robotic equipments, etc.) or an internet of things (IOT) based environment or a networked environment, and/or the like.

The term "tag" is used hereinafter to refer to a unique identifier that can identify an electronic component. In some examples, the tag can also uniquely identify a data entity or a function that can be associated with the electronic component. In some examples, the tag can uniquely identify a data value, e.g. a result or outcome of a function performed by the electronic component. The tag can represent a tag name that can be defined based on a defined nomenclature. The tag name can be used by various electronic components of a system as a reference to address any of, an electronic component, a data value associated with the electronic component, a function associated with the electronic component. In some example embodiments, the tag can represent a stored variable, an electronic component setting, an electronically stored model, a serial number, a nameplate information comprising at least one of a model number, a serial number, a manufacture date, a manufacturer name etc.

The term "computing platform" is used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smartphone, thereby enabling it to function as an Internet server (e.g., an enterprise e-mail server) only to the extent necessary to provide the functionality described herein. In some example embodiments, the computing platform may correspond to any of, an industrial computer, a cloud computing-based platform, an external computer, a standalone computing device, and/or the like. According to some example embodiments described herein, the computing platform may manage configuration of tags associated with electronic components by generating tag names of tags based on a tag nomenclature.

In an industrial environment, many electronic components are used for performing various operations. In some installations, these electronic components are in a networked environment i.e. an environment in which many electronic components can be connected over a network and can communicate amongst each other. In some examples, these electronic components can communicate or interface with other equipments based on defined protocols, for example, an Open-Proprietary communication (OPC) or Open-Platform Communications standard. In this regard, there exists standards for communication (e.g. an OPC UA/DA communication-based standard) which are commonly integrated and used, nowadays, in most of product offerings by electronic component manufacturers (e.g. PLC manufacturers). Said that, many B2B and B2C industry set-ups may involve integration and/or interfacing of many electronic components of systems (e.g. enterprise system) of different business entities. In other words, in some instances, a business entity may offer a software solution or product that may require interfacing and exchange (e.g. of data and control commands) amongst various electronic components of a customer's existing solution and the software solution or the product offered by the business entity. Also, at times, in an IoT based environment, some entities may have a mix of Open-Proprietary control systems that can difficult to integrate with other components, particularly, due to variation in standards, naming convention, and/or protocols used by these components. For instance, in some examples, each business entity may define proprietary tag names associated with electronic components of its systems based on rules defined by that business entity. Integrating the electronic components across business entities is challenging due to variation in tag nomenclature for similar electronic components. Further, manually standardizing the tag nomenclatures (i.e. at a time of integration) for electronic components across different entities is challenging. For instance, in some examples, there may be a million of tag names associated with various electronic components in a networked environment which may require standardization to integrate two systems corresponding to different business entities.

Various example embodiments described herein relates to techniques for configuring a tag name of an electronic component in a networked environment. In an example embodiment, a system including a processor can automatically generate a tag name for an electronic component and configure the tag name for the electronic component. In this regard, the processor can be configured to identify a metadata associated with the plurality of tags. Further, the processor can be configured to recognize a set of tags from amongst the plurality of tags that exhibit a common relationship. The processor can recognize the set of tags by analyzing the metadata based on a pre-defined rule. In this regard, the relationship can be indicative of at least one of: a pattern, a behavior, a usage type, and an installation location, corresponding to the set of tags. Accordingly, the processor can be configured to generate a tag nomenclature for the set of tags and configure a tag name of the plurality of tags based on the tag nomenclature. Thus, by way of recognizing common relationship amongst pre-existing tag names based on the metadata associated with the tag names, the tags exhibiting similar behavior can be clustered. Further, a tag nomenclature can be generated for the clustered tags. Further details of the configuration of tag name of the electronic component are described in reference to FIGS. 1-8.

FIG. 1 illustrates a schematic view of a system 100 for configuration of a tag of an electronic component 102, in accordance with some example embodiments described herein. As illustrated, the system 100 can include a plurality of electronic components (102, 104, 106, 108, 110, 112, 10N-1, 10N). As described earlier, these electronic components can correspond to any physical component that can include, for example, an electronic circuitry, an electronic terminal, and/or the like. For instance, the electronic component can correspond to any of, a sensor, a variable frequency drive, an input/output peripheral, a programmable logic controller (PLCs), a programmable automation controller (PACs), an industrial computer, a desktop computer, a personal data assistant (PDAs), a laptop computer, a tablet computer, a personal computer, a barcode reader, a scanner, an indicia reader, an imager, a Radio-frequency identification (RFID readers or interrogators) component, a vehicle-mounted computer, a wearable barcode scanner, a wearable indicia reader, a point of sale (POS) terminal, a headset, and similar electronic devices that can configured to perform the various operations described herein. In some examples, the electronic component can correspond to a component that can be used in an industrial environment (e.g. a material handling environment including sorters, conveyors, robotic equipments, etc.), an internet of things (IoT) based environment, a networked environment, and/or the like.

Some examples of electronic components of the system 100 are illustrated in FIG. 1. For example, the system 100 can include a first electronic component 102 which can be a sensor component (e.g. a photo eye, an image sensor, a temperature sensor etc.). The system 100 can further, as an example, include a second electronic component 104 such as, a scanner. Further, as an example, the system 100 can include a third electronic component 106 such as, a database server. Further, as an example, the system 100 can include a fourth electronic component 108 such as, one or more programmable logic controllers (PLCs). Further, as an example, the system 100 can include a fifth electronic component 110 such as, a control server. Accordingly, the system 100 can include various electronic components that can be communicatively coupled over a network 103. Thus, the system 100, in a manner, illustrates, a networked environment, in which the plurality of electronic components (102-10N) can be communicatively coupled amongst each other. accordance with some example embodiments described herein. In this regard, in some example embodiments, the plurality of electronic components (102-10N) may be commissioned and/or configured to perform a particular functionality in a working environment (e.g. an industrial site). Said that, the networked environment illustrated herein, may correspond to an environment or set-up in which one or more of, the plurality of electronic component (102-10N) can communicate data amongst one another using the network 103.

According to various example embodiments described herein, the network 103 referred herein may correspond to a communication network that can support communication of data amongst the electronic components (102-10N). In some example embodiments, the network 103 may correspond to communication network, for example, but are not limited to, a Wireless Fidelity (Wi-Fi) network, a Piconet, a Personal Area Network (PAN), Zigbee, and a Scatternet. In some examples, the network 103 may correspond to a short range wireless network through which the plurality of electronic components (102-10N) may communicate with each other using one or more communication protocols such as, but are not limited to, Wi-Fi, Bluetooth, Bluetooth low energy (BLE), Zigbee, and Z-Wave. In some examples, the network 103 can correspond to a network in which the plurality of electronic components (102-10N) may communicate with each other using other various wired and wireless communication protocols such as Transmission Control Protocol and Internet Protocol (TCP/IP), User Datagram Protocol (UDP), and 2G, 3G, 4G, or 5G communication protocols. In some examples, the network 103 can correspond to any communication network such as, but not limited to, LORA, cellular (NB IoT, LTE-M, Leaky Feeder Coax, etc.). In some example embodiments, the network 103 can also correspond to a block chain network established amongst the plurality of electronic components (102-10N).

According to some example embodiments, an electronic component of the plurality of electronic components (102-10N) may include various sub-components and can be configured to perform various operations. Illustratively, the first electronic component 102 can comprise at least one of: a sensor unit 113, a processing unit 115, a memory 117, an input/output circuit 119, and a communication circuit 121. In some examples, one or more of the sensor unit 113, the memory 117, the input/output circuit 119, and/or the communication circuit 121 may be communicatively coupled to the processing unit 115.

In an example embodiment, the sensor unit 113 that may include any sensor for example, but not limited to, photo eyes, image sensor, inertial sensors (e.g. gyroscope, accelerometer etc.), temperature sensor, humidity sensor, pressure sensor, and/or the like. In some examples, these sensors can correspond to sensors used in an industrial environment for sensing various parameters.

According to some example embodiments, the processing unit 115 can correspond to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, the processing unit 115 can refer to an integrated circuit, an application-specific integrated circuit (ASIC), a digital signal processor (DSP), a field-programmable gate array (FPGA), a programmable logic controller (PLC), a complex programmable logic device (CPLD), a discrete gate or transistor logic, discrete hardware components, or any combination thereof designed to perform the functions described herein. In some examples, the processing unit 115 can also exploit Nano-scale architectures such as, but not limited to, molecular and quantum-dot based transistors, switches and gates, in order to optimize space usage or enhance performance of user equipment. In some example embodiments, the first electronic component may correspond to a passive device which may not have the processing unit 115.

Further, the communications circuit 121 referred herein, may be configured to receive and/or transmit data from/to a network and/or any other electronic component, electronic device, circuitry, or module in communication over the network 103. To this end, in some example embodiments, the communications circuit 121 referred herein, may be any means such as a device or circuitry embodied in either hardware or a combination of hardware and software associated with the respective component of the system 100. In some examples, the communications circuit 121 may comprise a network interface for enabling communications with a wired or wireless communication network. For example, the communications circuitry may comprise one or more network interface cards, antennae, buses, switches, routers, modems, and supporting hardware and/or software, or any other device suitable for enabling communications via the network 103. Additionally, or alternatively, the communications circuit 121 may comprise the circuitry for interacting with the antenna(s) to cause transmission of signals via the antenna(s) or to handle receipt of signals received via the antenna(s). These signals may be transmitted by any of the electronic components of the system 100 and/or the processing unit 115 over the network 103, using a number of wireless personal area network (PAN) technologies, such as, but not limited to, Bluetooth® v1.0 through v3.0, Bluetooth Low Energy (BLE), infrared wireless (e.g., IrDA), ultra-wideband (UWB), induction wireless transmission, and/or the like or via a wired communication technology, such as a data field bus, cables etc. In an example embodiment, the communication circuit 115 may be configured to support transmission and receiving of data communicated through the first electronic component 102.

According to some example embodiments, the I/O circuit 119 may, in turn, be in communication with the processing unit 115 to provide output to a user and, in some embodiments, to receive an indication of user input. The I/O circuit 119 may comprise a user interface and may comprise a display that may comprise a web user interface, a mobile application, a client device, and/or the like. In some embodiments, the I/O circuit 119 may also comprise a keypad, a joystick, a touch screen, touch areas, soft keys, a microphone, a speaker, or other input/output mechanisms. In some examples, the processing unit 115 and/or a user interface circuitry comprising a processor associated with the I/O circuit 119 may be configured to control one or more functions of one or more user interface elements associated with the I/O circuit 119 through computer program instructions (e.g., software and/or firmware) stored on the memory 117 accessible to the processing unit 115.

Illustratively, the system 100 can also comprise a computational platform 150. In some example embodiments, the plurality of electronic components (102-10N) may be communicatively coupled to the computational platform 150, via the network 103. According to an example embodiment, the computational platform 150 can correspond to a remote server or a device that can be used for configuring tag nomenclatures of the plurality of electronic components (102-10N) of the networked environment. Illustratively, the computational platform 150 can include a processing circuit 123. In some examples, the processing circuit 123 can be similar to the processing unit 115 as described earlier. According to some example embodiments, the computational platform 150 can be configured to identify and configure tag nomenclatures of the plurality of electronic components (102-10N) in the networked environment. In this regard, in some examples, the computational platform 150 may identify such electronic components from amongst the plurality of electronic components (102-10N) for which the tags associated with such electronic component exhibits a common relationship. For example, the computational platform 150 may recognize a set of tags associated with some electronic components that exhibits for example, but not limited to, a similar pattern, a similar trend, a similar usage of the electronic components, a common location of installation, etc. Further, based on the recognition, the computational platform 150 may automatically group or cluster the tags associated with such electronic components under a tag nomenclature that can be used as a standard tag nomenclature across different business entities. Further details of configuring tag nomenclature for electronic components are described in reference to FIGS. 2-6.

FIGS. 2-6 illustrates various example flowcharts representing methods of configuration of a tag nomenclature for an electronic component, in accordance with various example embodiments described herein. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for the implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 2 through 6, when executed, convert the computer or processing circuitry into a particular machine configured to perform an example embodiment of the present invention. Accordingly, the operations of FIGS. 2 through 6 can define an algorithm for configuring a computer or processor, to perform an example embodiment. In some cases, a general-purpose computer may be provided with an instance of the processor which performs the algorithm of FIGS. 2 through 6 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

Figure 2:
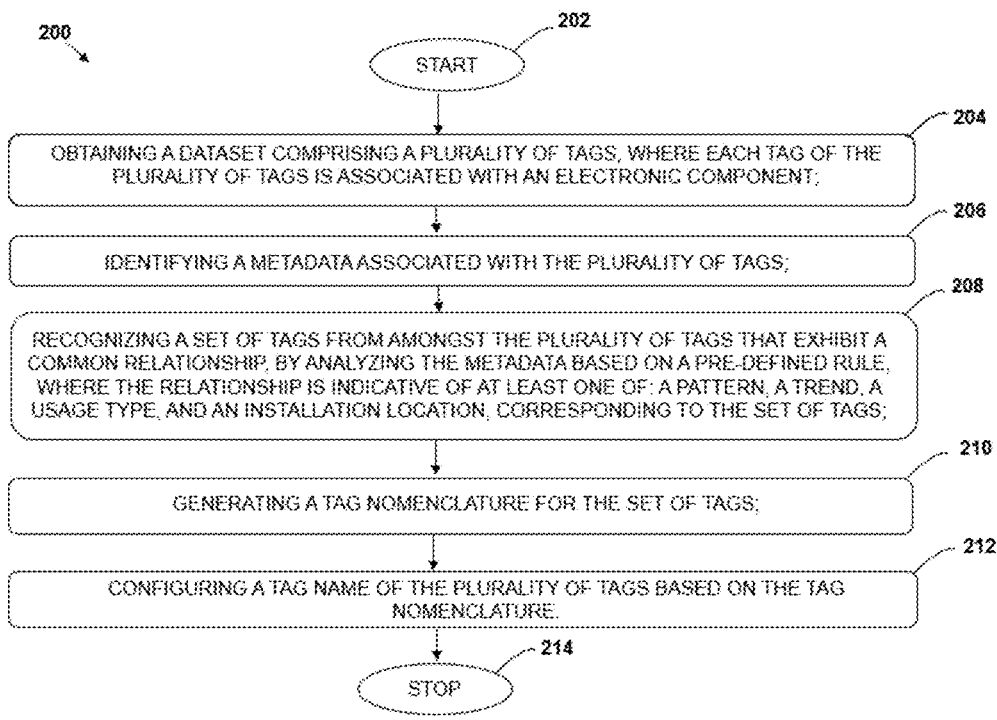
FIG. 2 illustrates an example flowchart representing a method of configuration of a tag of an electronic component, in accordance with some example embodiments described herein.

FIG. 2 illustrates an example flowchart representing a method 200 of configuration of a tag of an electronic component, in accordance with some example embodiments described herein. The method starts at step 202. At step 204, the system 100 may include means such as, the processing circuit 123 to obtain a dataset comprising a plurality of tags. In this regard, each tag of the plurality of tags can be associated with an electronic component. For example, each tag of the plurality of tags can be associated with each of the plurality of electronic components (102-10N) as described in reference to FIG. 1.

In some example embodiments, each tag of the plurality of tags can also be associated with a data entity associated with the electronic component. For instance, a tag can uniquely identify a function performed by an electronic component. In some examples, the tag can also uniquely identify a data or output recorded by the electronic component. According to some example embodiments, the plurality of tags can be used to perform communication based on one of: an open proprietary communication (OPC) and open standard communication protocol (OSP).

As an example, a tag name can be 'CP12RunStatus' indicating a running status of a control panel component of the system 100. In another example, a tag name can be 'LowerSort1RunStatus' indicating a running status of a lower sorter component of a material handling system. In another example, the tag name can be 'LowerSortLane13DivertedCartons' indicating details of cartons diverted on a lane number thirteen by the lower sorter component of the material handling system. Accordingly, there can be a tag name that may be associated with at least one of: an electronic component, a functionality performed by the electronic component, and/or a data value recorded or outputted by the electronic component of the system 100. Further, a communication amongst the plurality of electronic components of a networked environment (e.g. based on a OPC or OSP based protocol) can involve use of these tag names to address at least one of: the electronic component, the functionality performed by the electronic component, and/or the data value recorded or outputted by the electronic component.

Moving to step 206, the processing circuit 123 can identify a metadata associated with the plurality of tags. In some examples, the metadata can be data associated with the plurality of tags and/or the plurality of electronic components of the system 100. For instance, the metadata can be indicative of a data value recorded by an electronic component of the system 100.

Based on identifying the metadata, at step 208, the system 100 can include means such as, the processing circuit 123 to recognize a set of tags from amongst the plurality of tags that exhibits a common relationship. In this regard, in some example embodiments, the set of tags exhibiting common relationship can be recognized by analyzing the metadata. The metadata can be analyzed based on a pre-defined rule applicable based on a type of electronic component to which a tag is associated. In some examples, the metadata can be analyzed based on pattern, trend, or a relationship existing amongst the metadata. FIGS. 3-6 describe more details about the recognizing of the set of tags based on pre-defined rules that can be applicable for different types of electronic components to which tags are respectively associated.

In some examples, the common relationship can be indicative of at least one of: a pattern, a behavior, a usage type, and an installation location, corresponding to the set of tags. In other words, the processing circuit 123 can use the metadata associated with the plurality of tags to recognize such tags (i.e. the set of tags) that exhibit common relationship in terms of: a pattern (e.g. a data output pattern), a usage type, a place of installation, etc. related to the electronic component to which the respective tag is associated. Thus, the processing circuit 123 can cluster or group such tags from amongst the plurality of tags which exhibit a common relationship. In some examples, although, the set of tags recognized by the processing circuit 123 can be grouped based on a common relationship, however, each tag of the set of tags may have its own tag name that can be defined based on different tag nomenclatures. In other words, there may be two different tag names that can be existing for a similar type of electronic components. This may be due to different tag nomenclature practices used in a business entity where the electronic component may be available.

At step 210, the processing circuit 123, in response to recognizing the set of tags, can generate a tag nomenclature for the set of tags. Said differently, the processing circuit 123 can define the tag nomenclature that can be used for the set of tags. Further, at step 212, the processing circuit 123 can configure the plurality of tags based on the tag nomenclature. In this regard, in some examples, the processing circuit 123 can further identify all remaining tags of the plurality of tags that can exhibit common relationship to the set of tags. In some examples, the processing circuit 123 may also identify tags associated with newly added electronic components in the system 100 that may exhibit a similar relationship to the set of tags. The processing circuit 123 can further configure such tags based on the tag nomenclature defined at the step 210. The method stops at step 214.

Figure 3:
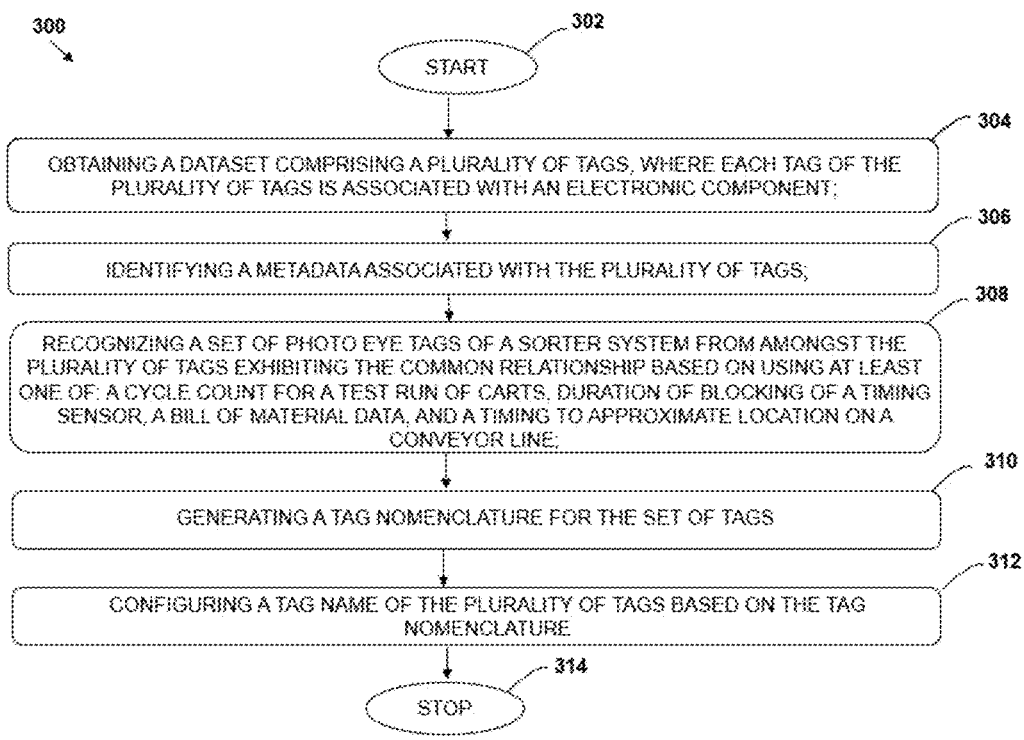
FIG. 3 illustrates an example flowchart representing a method of configuration of a tag of a photo eye, in accordance with some example embodiments described herein.

In some example embodiments, the system 100 can include a plurality of photo eyes that be communicatively coupled to plurality of other electronic components in a networked environment. For instance, in a material handling environment, there can be a plurality of photo eyes that can be installed for example, along a sorter, a conveyor etc., for tracking one or more items under transit. In this regard, each photo eye can be uniquely identified by a tag name. Further, a data outputted by each photo eye can also be uniquely identified by a tag name. Said that, any electronic component can communicate with these photo eyes based on using its respective tag name. FIG. 3 illustrates an example flowchart representing a method 300 of configuration of a tag associated with a photo eye, in accordance with some example embodiments described herein.

The method starts at step 302. At step 304, the system 100 may include means such as, the processing circuit 123 to obtain a dataset comprising a plurality of tags. In this regard, some tags from amongst the plurality of tags can be associated with sensors e.g. photo eyes. Said that, the plurality of tags can also include tags that can be associated with electronic components other than the photo eyes.

At step 306, the processing circuit 123 can identify metadata associated with the plurality of tags. In some examples, the metadata can be indicative of a count of cycles for a set of test run of items (e.g. carts) on a conveyor of the material handling environment. In another example, the metadata can be indicative of duration of time for which the photo eyes can be blocked and/or unblocked. In another example, the metadata can be indicative of a length of a tag associated with an item monitored by the photo eye. In another example, the metadata can be associated with a timing to approximate location information on a conveyor line of the material handling environment. In another example, the metadata can be associated with reference drawings or bill of material associated with installation of the photo eyes in the material handling environment.

At step 308, the processing circuit 123 can recognize a set of photo eye tags from amongst the plurality of tags that can exhibit a common relationship related to the photo eyes. For instance, the processing circuit 123 can recognize the set of tags based on using at least one of: the cycle count for a test run of carts, the duration of blocking of the photo eye sensor, the bill of material data associated with the reference drawings, and the timing to approximate location on the conveyor line. In this regard, the processing unit 123 can use the metadata associated with the photo eyes to identify the common relationship, thereby, recognizing the set of photo eye tags.

Moving to step 310, the processing circuit 123, in response to recognizing the set of photo eye tags, can generate a tag nomenclature for the set of photo eye tags. Said differently, the processing circuit 123 can define the tag nomenclature that can be used for the set of photo eye tags. Further, at step 312, the processing circuit 123 can configure the plurality of tags based on the tag nomenclature. In this regard, in some examples, the processing circuit 123 can further identify all remaining tags that can be associated with any photo eye component of the networked environment and can further configure such tags based on the tag nomenclature defined at the step 310. The method stops at step 314.

Figure 4:
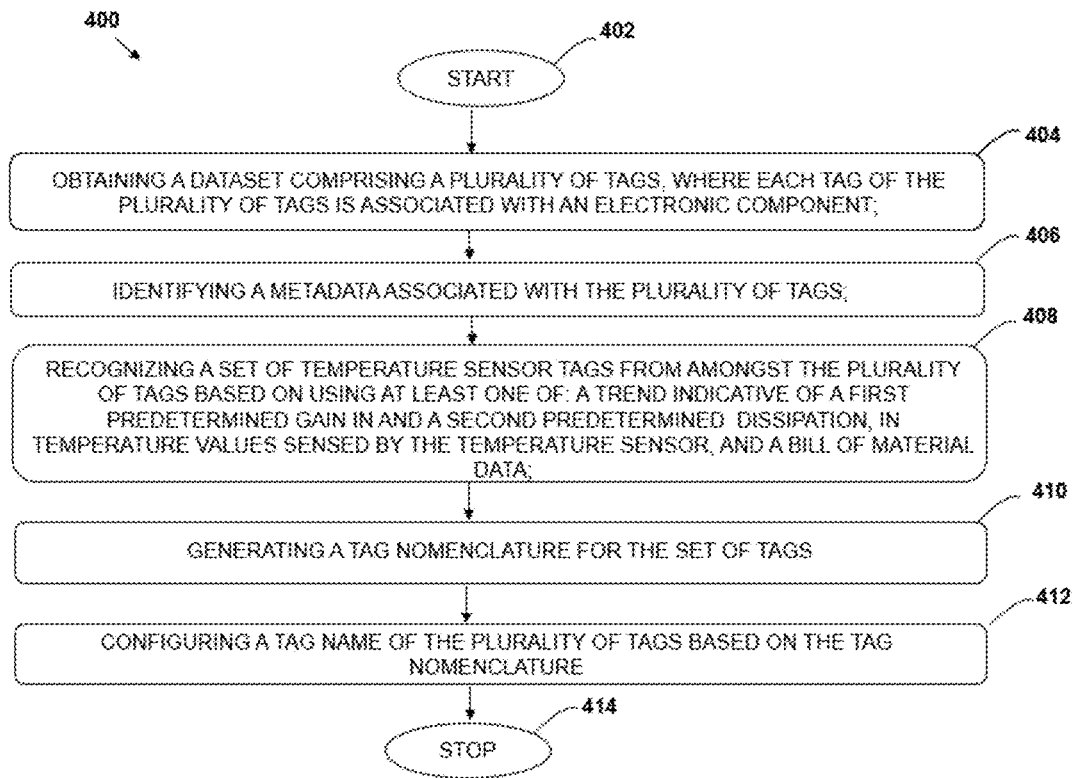
FIG. 4 illustrates an example flowchart representing a method of configuration of a tag of a temperature sensor, in accordance with some example embodiments described herein.

In some example embodiments, the system 100 can include a plurality of temperature sensors that be communicatively coupled to plurality of other electronic components in a networked environment. FIG. 4 illustrates an example flowchart representing a method 400 of configuration of a tag of a temperature sensor, in accordance with some example embodiments described herein.

The method starts at step 402. At step 404, the system 100 may include means such as, the processing circuit 123 to obtain a dataset comprising a plurality of tags. In this regard, some tags from amongst the plurality of tags can be associated with sensors e.g. temperature sensors. Said that, the plurality of tags can also include tags that can be associated with electronic components other than the temperature sensor.

At step 406, the processing circuit 123 can identify metadata associated with the plurality of tags. In some examples, the metadata can be indicative of a distinct trend that can be associated with values sensed by temperature sensors that can be installed in an industrial environment. For instance, in an example, the temperature sensor values may be indicative of a distinct trend that can be recognized, in some instances, for example, when an installation (e.g. the system 100) in which the temperature sensors are installed can be powered up and/or shut down. In some examples, the metadata can be indicative of rapid heat gain that can be observed during a startup of the system 100. In some examples, the metadata can be indicative of a slow steady state dissipation that can be observed on shutdown of the installation.

At step 408, the processing circuit 123 can recognize a set of temperature sensor tags from amongst the plurality of tags that can exhibit a common relationship related to the temperature sensors. In some examples, the processing circuit 123 can recognize the set of temperature sensor tags based on using at least one of: the trend indicative of a first predetermined gain and a second predetermined dissipation, in temperature values sensed by the temperature sensor, and a bill of material data. In this regard, the first predetermined gain and the second predetermined dissipation can be defined based on factors e.g., but not limited to, an industrial site, a user input, previous gain and dissipation values etc.

Moving to step 410, the processing circuit 123, in response to recognizing the set of temperature sensor tags, can generate a tag nomenclature for the set of temperature sensor tags. Said differently, the processing circuit 123 can define the tag nomenclature that can be used for the set of temperature sensor tags. Further, at step 412, the processing circuit 123 can configure the plurality of tags based on the tag nomenclature. In this regard, in some examples, the processing circuit 123 can further identify all remaining tags that can be associated with any temperature sensors of the networked environment and can further configure such tags based on the tag nomenclature defined at the step 410. The method 400 stops at step 414.

Figure 5:
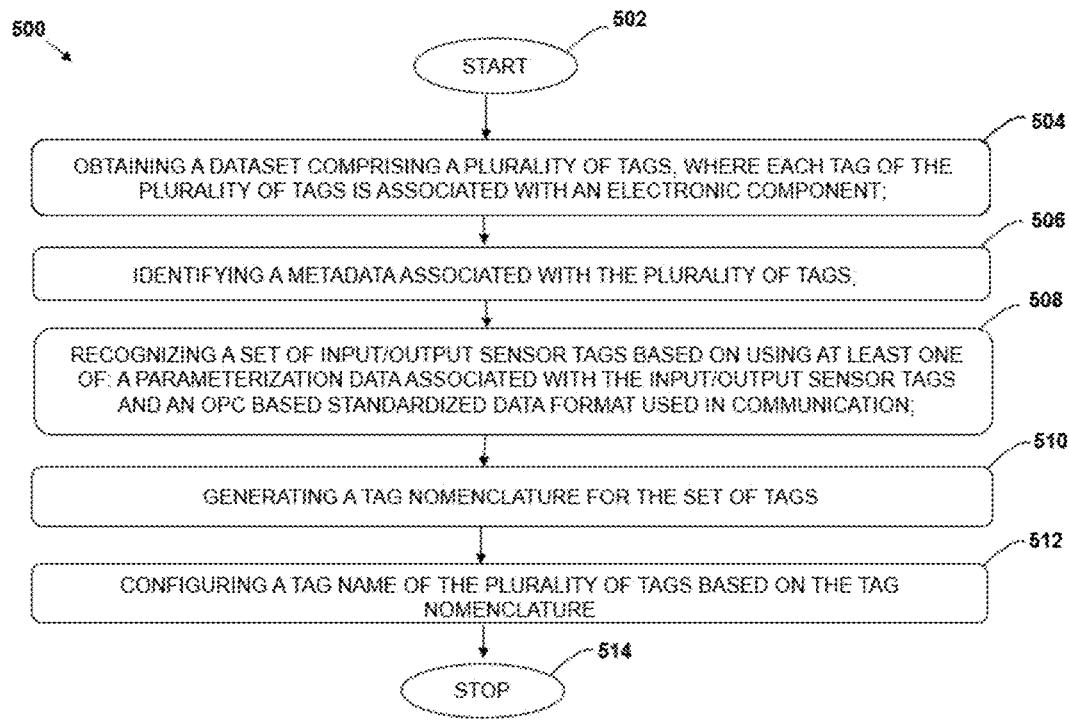
FIG. 5 illustrates an example flowchart representing a method of configuration of a tag of an input/output (I/O) sensor, in accordance with some example embodiments described herein.

In some example embodiments, the system 100 can include a plurality of input/output sensors that be communicatively coupled to plurality of other electronic components in a networked environment. FIG. 5 illustrates an example flowchart representing a method 500 of configuration of a tag of an input/output (I/O) sensor, in accordance with some example embodiments described herein.

The method 500 starts at step 502. At step 504, the system 100 may include means such as, the processing circuit 123 to obtain a dataset comprising a plurality of tags. In this regard, some tags from amongst the plurality of tags can be associated with sensors e.g. input/output sensors (i.e. sensors that may be used for providing input or output in an industrial environment). Said that, the plurality of tags can also include tags that can be associated with electronic components other than the I/O sensors.

At step 506, the processing circuit 123 can identify metadata associated with the plurality of tags. In some examples, the metadata can be indicative of information associated with a sensor level communication protocol (e.g. a protocol defined by the OPC foundation) that can be used for communication by the I/O sensors. In some examples, the metadata can be indicative of parameterization data associated with the I/O sensors. For instance, in an example, the system 100 may include some I/O components can support parameterization from an IO-Link controller of the system 100. In this regard, the parameterization data associated with the I/O components can be identified as the metadata by the processing circuit 123.

At step 508, the processing circuit 123 can recognize a set of I/O sensor tags from amongst the plurality of tags that can exhibit a common relationship related to the I/O sensors. In some examples, the processing circuit 123 can recognize the set of I/O sensor tags based on using at least one of: the parameterization data associated with the input/output sensor tags and the OPC based standardized data format used in communication by the I/O sensors.

Moving to step 510, the processing circuit 123, in response to recognizing the set of I/O sensor tags, can generate a tag nomenclature for the set of I/O sensor tags. Said differently, the processing circuit 123 can define the tag nomenclature that can be used for naming of the set of I/O sensor tags. Further, at step 512, the processing circuit 123 can configure the plurality of tags based on the tag nomenclature. The method 500 stops at step 514.

Figure 6:
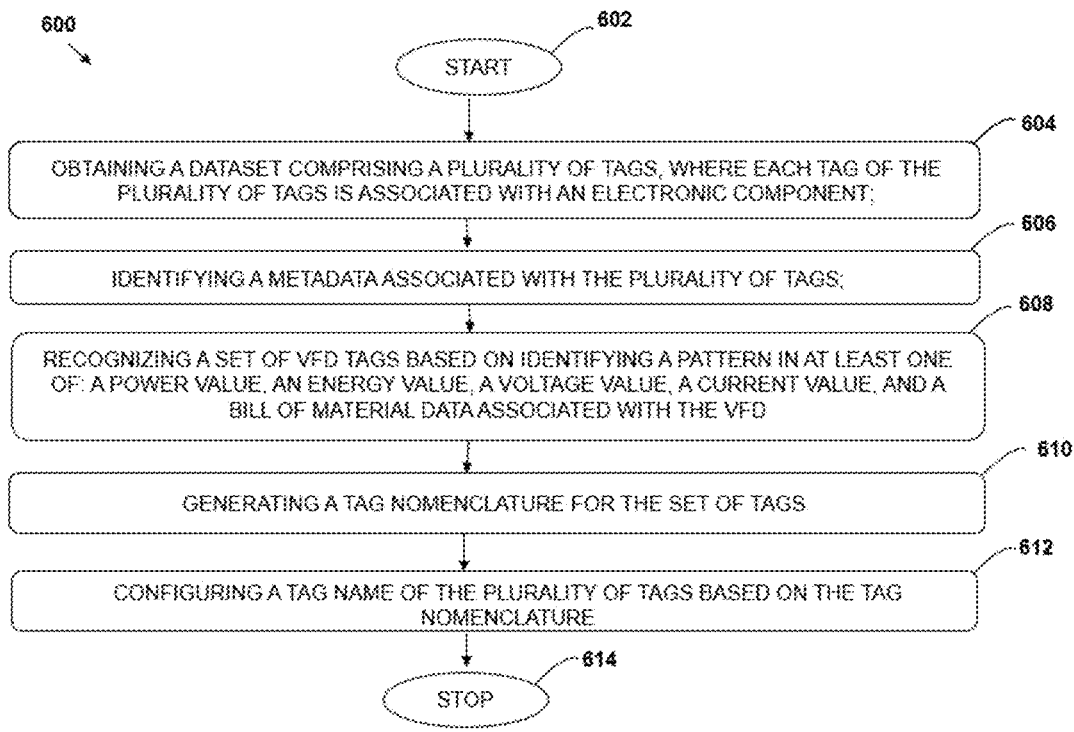
FIG. 6 illustrates an example flowchart representing a method of configuration of a tag of a variable frequency drive (VFD), in accordance with some example embodiments described herein.

In some example embodiments, the system 100 can include a plurality of variable frequency drive (VFD) components that be communicatively coupled to plurality of other electronic components in a networked environment. In some examples, the system 100 can include components on a closed-loop servo drive system and/or different feedback devices like encoders and resolvers for rotating and linear systems. FIG. 6 illustrates an example flowchart representing a method 600 of configuration of a tag of a VFD, in accordance with some example embodiments described herein.

The method 600 starts at step 602. At step 604, the system 100 may include means such as, the processing circuit 123 to obtain a dataset comprising a plurality of tags. In this regard, some tags from amongst the plurality of tags can be associated with VFD components of the system 100. Said that, the plurality of tags can also include tags that can be associated with electronic components other than the VFD components.

At step 606, the processing circuit 123 can identify metadata associated with the plurality of tags. In some examples, the metadata can be indicative of an in-rush current pattern upon start-up of the VFD components. In another example, the metadata can be indicative a system throughput that can be ramped up incrementally using one or more of the VFD components. In some examples, the metadata can be indicative of a power fluctuation/harmonic associated with one or more of the VFD components. In some examples, the metadata can be indicative of values such as, voltage, power, current etc. associated with the VFD components. In some examples, the metadata can be associated with run status associated with a state of a VFD component. In another example, the metadata can be indicative of a reference drawing or a bill of material with an expected count of the VFD components.

At step 608, the processing circuit 123 can recognize a set of VFD tags from amongst the plurality of tags that can exhibit a common relationship related to the VFD components. In some examples, the processing circuit 123 can recognize the set of VFD tags based on based on identifying a pattern in at least one of: a power value, an energy value, a voltage value, a current value, and a bill of material data, associated with the VFD components.

Moving to step 610, the processing circuit 123, in response to recognizing the set of VFD tags, can generate a tag nomenclature for the set of VFD tags. Said differently, the processing circuit 123 can define the tag nomenclature that can be used for naming of the set of VFD tags. Further, at step 612, the processing circuit 123 can configure the plurality of tags based on the tag nomenclature. The method 600 stops at step 614.

Figure 7:
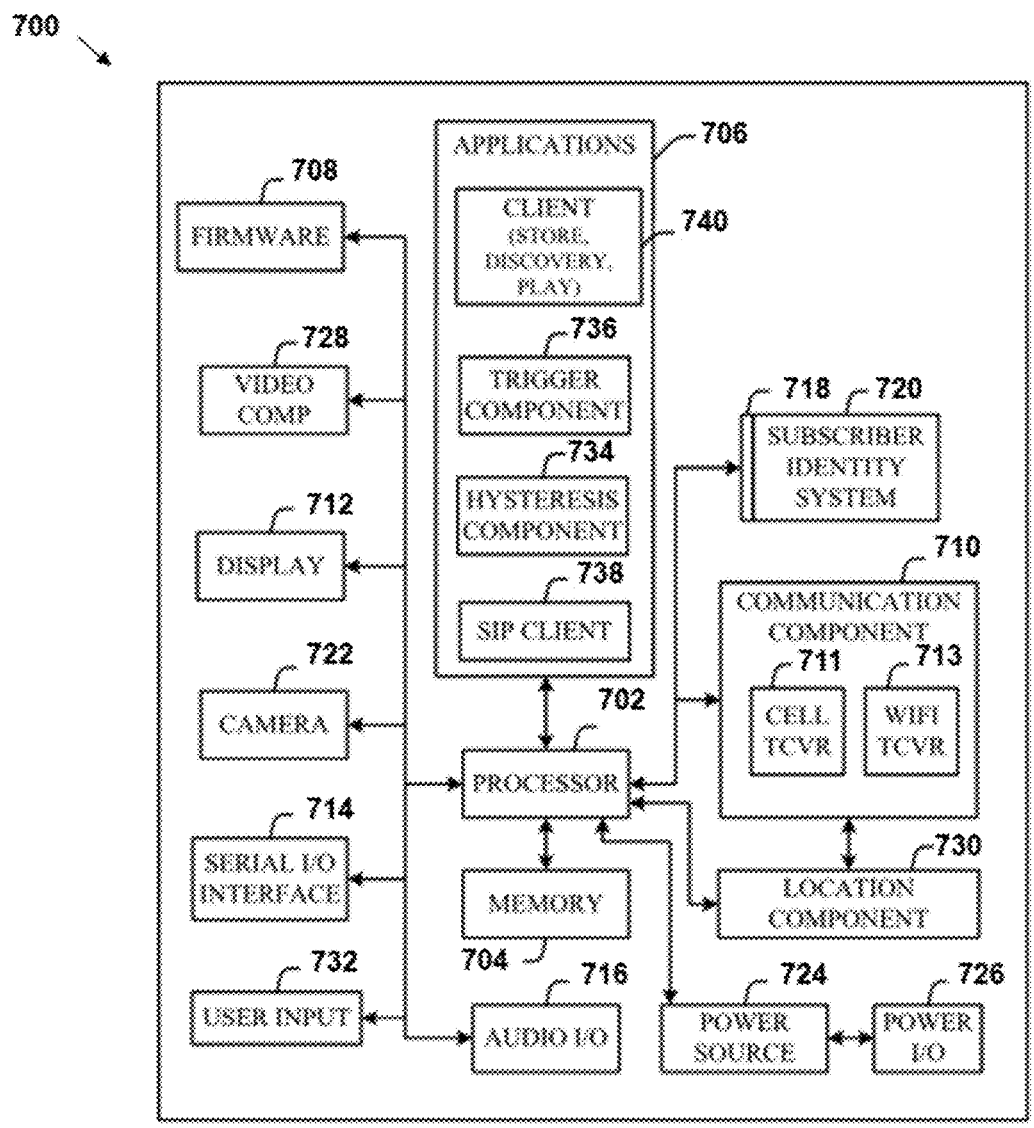
FIG. 7 illustrates a schematic view of an example electronic component, in accordance with some example embodiments described herein.

FIG. 7 illustrates a schematic view of an example electronic component 700, in accordance with some example embodiments described herein. To this end, the following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., described herein in accordance with example embodiments, that can perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

According to some example embodiments, the electronic component 700 can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

According to some example embodiments described herein, a communication media typically embodies computer-readable instructions, data structures, program modules or other data in a modulated data signal such as a carrier wave or other transport mechanism and includes any information delivery media. In this regard, the term "modulated data signal" can correspond to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

According to some example embodiments, the electronic component 700 can comprise a processor 702 for controlling and processing all onboard operations and functions. A memory 704 interfaces to the processor 702 for storage of data and one or more applications 706 (e.g., a video player software, user feedback component software, etc.). Other applications can include voice recognition of predetermined voice commands that facilitate initiation of the user feedback signals. The applications 706 can be stored in the memory 704 and/or in a firmware 708 and executed by the processor 702 from either or both the memory 704 or/and the firmware 708. The firmware 708 can also store startup code for execution in initializing the electronic component. A communications component 710 interfaces to the processor 702 to facilitate wired/wireless communication with external systems, e.g., cellular networks, VoIP networks, and so on. Here, the communications component 710 can also include a suitable cellular transceiver 711 (e.g., a GSM transceiver) and/or an unlicensed transceiver 713 (e.g., Wi-Fi, WiMax) for corresponding signal communications. The electronic component can be a device such as a cellular telephone, a PDA with mobile communications capabilities, and messaging-centric devices. The communications component 710 also facilitates communications reception from terrestrial radio networks (e.g., broadcast), digital satellite radio networks, and Internet-based radio services networks.

The electronic component can also comprise a display 712 for displaying text, images, video, telephony functions (e.g., a Caller ID function), setup functions, and for user input. For example, the display 712 can also be referred to as a "screen" that can accommodate the presentation of multimedia content (e.g., music metadata, messages, wallpaper, graphics, etc.). The display 712 can also display videos and can facilitate the generation, editing and sharing of video quotes. A serial I/O interface 714 is provided in communication with the processor 702 to facilitate wired and/or wireless serial communications (e.g., USB, and/or IEEE 1394) through a hardwire connection, and other serial input devices (e.g., a keyboard, keypad, and mouse). This support updating and troubleshooting the electronic component, for example. Audio capabilities are provided with an audio I/O component 716, which can include a speaker for the output of audio signals related to, for example, indication that the user pressed the proper key or key combination to initiate the user feedback signal. The audio I/O component 716 also facilitates the input of audio signals through a microphone to record data and/or telephony voice data, and for inputting voice signals for telephone conversations.

In some examples, the electronic component 700 can also comprise a slot interface 718 for accommodating a SIC (Subscriber Identity Component) in the form factor of a card Subscriber Identity Module (SIM) or universal SIM 720 and interfacing the SIM card 720 with the processor 702. However, it is to be appreciated that the SIM card 720 can be manufactured into the electronic component 709 and updated by downloading data and software.

The electronic component can also process IP data traffic through the communication component 710 to accommodate IP traffic from an IP network such as, for example, the Internet, a corporate intranet, a home network, a person area network, etc., through an ISP or broadband cable provider. Thus, VoIP traffic can be utilized by the electronic component and IP-based multimedia content can be received in either an encoded or decoded format.

A video processing component (i.e. a camera 722) can be provided for decoding encoded multimedia content. The video processing component 722 can aid in facilitating the generation, editing and sharing of video quotes. The camera 722 can be configured to capture images of an environment in field of view of the camera 722. The electronic component also includes a power source 724 in the form of batteries and/or an AC power subsystem, which power source 724 can interface to an external power system or charging equipment (not shown) by a power I/O component 726.

According to some example embodiments, the electronic component can also comprise a video component 728 for processing video content received and, for recording and transmitting video content. For example, the video component 728 can facilitate the generation, editing and sharing of video quotes. In some example embodiments, a location tracking component 730 facilitates geographically locating the electronic component. As described hereinabove, this can occur when the user initiates the feedback signal automatically or manually. According to some example embodiments, a user input component 732 facilitates the user initiating the quality feedback signal. In this regard, in some examples, the user input component 732 can also facilitate the generation, editing and sharing of video quotes. According to various example embodiments described herein, the user input component 732 can include such conventional input device technologies such as a keypad, keyboard, mouse, stylus pen, and/or touch screen, for example.

Referring again to the applications 706, a hysteresis component 734 can facilitate the analysis and processing of hysteresis data, which is utilized to determine when to associate with the access point. A software trigger component 736 can be provided that facilitates triggering of the hysteresis component 734 when the Wi-Fi transceiver 713 detects the beacon of the access point. A SIP client 738 enables the electronic component to support SIP protocols and register the subscriber with the SIP registrar server. In some example embodiments, the applications 706 can also include a client 740 that provides at least the capability of discovery, play and store of multimedia content, for example, music.

In some example embodiments, the electronic component, as indicated above related to the communications component 710, includes an indoor network radio transceiver 913 (e.g., Wi-Fi transceiver). This function can support the indoor radio link, such as IEEE 802.11, for the dual-mode GSM handset. In some example embodiments, the electronic component can accommodate at least satellite radio services through a handset that can combine wireless voice and digital radio chipsets into a single handheld device.

Figure 8:
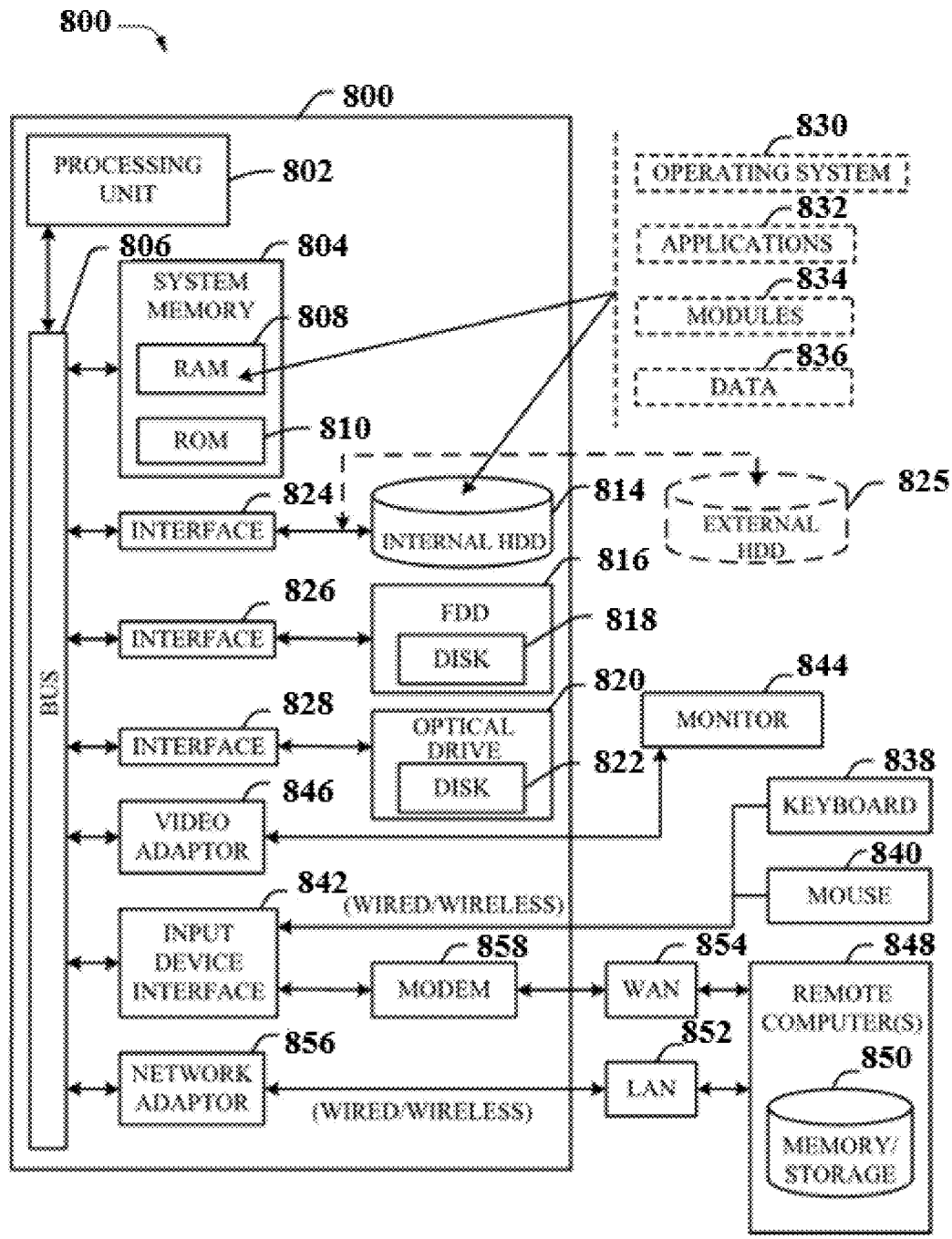
FIG. 8 illustrates a schematic view of another example electronic component, in accordance with some example embodiments described herein.

FIG. 8 illustrates a schematic view of another example electronic component 800, in accordance with some example embodiments described herein. The electronic component 800 described in FIG. 8, according to some examples, can correspond to any of the plurality of electronic components (102-10N) and/or the computational platform 105, as described before. The electronic component 800, in some examples, can correspond to a computer or an electronic device.

Referring now to FIG. 8, there is illustrated a block diagram of the electronic component 800 operable to execute the functions and operations performed in the described example embodiments. In some example embodiments, the electronic component 800 can provide networking and communication capabilities between a wired or wireless communication network and a server and/or communication device. In order to provide additional context for various aspects thereof, FIG. 8 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, mini-computers, mainframe computers, as well as personal computers, hand-held electronic components, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, electronic components typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote electronic components, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 8, implementing various aspects described herein with regards to the end-user device can comprise the electronic component 800 comprising a processing unit 802, a system memory 804 and a system bus 806. The system bus 806 can be configured to couple system components including, but not limited to, the system memory 804 to the processing unit 802. In some example embodiments, the processing unit 802 can be any of various commercially available processors. To this end, in some examples, dual microprocessors and other multiprocessor architectures can also be employed as the processing unit 802.

According to some example embodiments, the system bus 806 can be any of several types of bus structure that can further interconnect to a memory bus (with or without a memory controller), a peripheral bus, and a local bus using any of a variety of commercially available bus architectures.

In some examples, the system memory 804 can comprise, read-only memory (ROM) 808 and random-access memory (RAM) 810. According to some example embodiments, a basic input/output system (BIOS) is stored in a non-volatile memory 812 such as ROM, EPROM, EEPROM, which BIOS contains the basic routines that help to transfer information between elements within the electronic component 800, such as during start-up. The RAM 810 can also comprise a high-speed RAM such as static RAM for caching data.

According to some example embodiments, the electronic component 800 can further comprise an internal hard disk drive (HDD) 814 (e.g., EIDE, SATA), which internal hard disk drive 814 can also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). In some examples, the hard disk drive 814, magnetic disk drive 816 and optical disk drive 820 can be connected to the system bus 806 by a hard disk drive interface 824, a magnetic disk drive interface 826 and an optical drive interface 828, respectively. According to some example embodiments, the interface 824 for external drive 825 implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the electronic component 800 the drives and media accommodate the storage of any data in a suitable digital format. Although the description of computer-readable media above refers to a HDD, a removable magnetic diskette, and a removable optical media such as a CD or DVD, it may be appreciated by those skilled in the art that other types of media which are readable by an electronic component 800, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 808, including an operating system 830, one or more application programs 832, other program modules 834 and program data 836. To this end, in some examples, all or portions of the operating system, applications, modules, and/or data can also be cached in the RAM 808. It is to be appreciated that the various embodiments can be implemented with various commercially available operating systems or combinations of operating systems.

According to some example embodiments, a user can enter commands and information into the electronic component 800 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. In some examples, these and other input devices are often connected to the processing unit 802 through an input device interface 842 that is coupled to the system bus 806, but can be connected by other interfaces, such as a parallel port, an IEEE 1394 serial port, a game port, a USB port, an IR interface, etc.

According to some example embodiments, a monitor 844 or other type of display device can also be connected to the system bus 806 through an interface, such as a video adapter 846. In addition to the monitor 844, the electronic component 800 can also comprise other peripheral output devices (not shown), such as speakers, printers, etc.

According to some example embodiments, the electronic component 800 can operate in a networked environment using logical connections by wired and/or wireless communications to one or more remote computers, such as a remote computer(s) 848. In some examples, the remote computer(s) 848 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 850 is illustrated. According to some example embodiments, the logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

In some examples, when used in a LAN networking environment, the electronic component 800 can be connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

In alternate examples, when used in a WAN networking environment, the electronic component 800 can include a modem 858, or can be connected to a communications server on the WAN 854 or has other means for establishing communications over the WAN 854, such as by way of the Internet. The modem 858, which can be internal or external and a wired or wireless device, is connected to the system bus 806 through the input device interface 842. In a networked environment, program modules depicted relative to the computer, or portions thereof, can be stored in the remote memory/storage device 850. It will be appreciated that the network connections shown are exemplary and other means of establishing a communications link between the computers can be used.

According to some example embodiments, the electronic component 800 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. Further, in accordance with some example embodiments described herein, a Wi-Fi network can be used to connect computers or the plurality of electronic devices 102-10N to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Electronic components typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote electronic components, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A system comprising:
    a processor configured to:
       obtain a dataset comprising a plurality of tags, wherein each tag of the plurality of tags is associated with an electronic component;
       identify metadata associated with the plurality of tags;
       recognize a set of tags from amongst the plurality of tags that exhibit a common relationship, by analyzing the metadata based on a pre-defined rule, wherein the relationship is indicative of at least one of: a pattern, a behavior, a usage type, and an installation location, corresponding to the set of tags;
       generate a tag nomenclature for the set of tags; and
       configure a tag name of the plurality of tags based on the tag nomenclature.

2. The system of claim 1 wherein the plurality of tags comprises at least one of: a sensor tag, a variable frequency drive (VFD) tag, or a programmable logic controller (PLC) tag.

3. The system of claim 2 wherein the sensor tag corresponds to a tag associated with one of: a photo eye, a temperature sensor, and an input/output sensor connected over a network.

4. The system of claim 3 wherein the processor is configured to:
    recognize a set of photo eye tags of a sorter system from amongst the plurality of tags exhibiting the common relationship based on using at least one of: a cycle count for a test run of carts, a duration of blocking of a timing sensor, a bill of material data, and a timing to approximate location on a conveyor line.

5. The system of claim 3 wherein the processor is configured to:
    recognize a set of temperature sensor tags based on using at least one of: a trend indicative of a first predetermined gain in and a second predetermined dissipation, in temperature values sensed by the temperature sensor, and a bill of material data.

6. The system of claim 3 wherein the processor is configured to:
    recognize a set of input/output sensor tags based on using at least one of: a parameterization data associated with the input/output sensor tags and an OPC based standardized data format used in communication.

7. The system of claim 2 wherein the processor is configured to: recognize a set of VFD tags based on identifying a pattern in at least one of: a power value, an energy value, a voltage value, a current value, and a bill of material data, associated with the VFD.

8. The system of claim 1, wherein each tag of the plurality of tags is associated with at least one of: the electronic component and a data entity associated with the electronic component and wherein the plurality of tags are used to perform communication based on one of: an open proprietary communication (OPC) and open standard communication protocol (OSP).

9. A method comprising:
    obtaining a dataset comprising a plurality of tags, wherein each tag of the plurality of tags is associated with an electronic component;
    identifying a metadata associated with the plurality of tags;
    recognizing a set of tags from amongst the plurality of tags that exhibit a common relationship, by analyzing the metadata based on a pre-defined rule, wherein the relationship is indicative of at least one of: a pattern, a trend, a usage type, and an installation location, corresponding to the set of tags;
    generating a tag nomenclature for the set of tags; and
    configuring a tag name of the plurality of tags based on the tag nomenclature.

10. The method of claim 9 wherein the plurality of tags comprises at least one of: a sensor tag, a variable frequency drive (VFD) tag, a programmable logic controller (PLC) tag.

11. The method of claim 10 wherein the sensor tag corresponds to a tag associated with one of: a photo eye, a temperature sensor, and an input/output sensor connected over a network.

12. The method of claim 11 comprising:
    recognizing a set of photo eye tags of a sorter system from amongst the plurality of tags exhibiting the common relationship based on using at least one of: a cycle count for a test run of carts, duration of blocking of a timing sensor, a bill of material data, and a timing to approximate location on a conveyor line;
    recognizing a set of temperature sensor tags based on using at least one of: a trend indicative of a first predetermined gain in and a second predetermined dissipation, in temperature values sensed by the temperature sensor, and a bill of material data; and
    recognizing a set of input/output sensor tags based on using at least one of: a parameterization data associated with the input/output sensor tags and an OPC based standardized data format used in communication.

13. The method of claim 10 comprising: recognizing a set of VFD tags based on identifying a pattern in at least one of: a power value, an energy value, a voltage value, a current value, and a bill of material data associated with the VFD.

14. The method of claim 9, wherein each tag of the plurality of tags is associated with at least one of: the electronic component and a data entity associated with the electronic component and wherein the plurality of tags are used to perform communication based on one of: an open proprietary communication (OPC) and open standard communication protocol (OSP).

15. A non-transitory computer readable medium that stores thereon computer-executable instructions that in response to execution by a processor, perform operations comprising:
    obtaining a dataset comprising a plurality of tags, wherein each tag of the plurality of tags is associated with an electronic component;
    identifying a metadata associated with the plurality of tags;
    recognizing a set of tags from amongst the plurality of tags that exhibit a common relationship, by analyzing the metadata based on a pre-defined rule, wherein the relationship is indicative of at least one of: a pattern, a trend, a usage type, and an installation location, corresponding to the set of tags;

generating a tag nomenclature for the set of tags; and configuring a tag name of the plurality of tags based on the tag nomenclature.

16. The non-transitory computer readable medium of claim 15 wherein the plurality of tags comprises at least one of: a sensor tag, a variable frequency drive (VFD) tag, a programmable logic controller (PLC) tag.

17. The non-transitory computer readable medium of claim 16 wherein the sensor tag corresponds to a tag associated with one of: a photo eye, a temperature sensor, and an input/output sensor connected over a network.

18. The non-transitory computer readable medium of claim 17 that stores thereon computer-executable instructions that in response to execution by a processor, perform operations further comprising:

recognizing a set of photo eye tags of a sorter system from amongst the plurality of tags exhibiting the common relationship based on using at least one of: a cycle count for a test run of carts, duration of blocking of a timing sensor, a bill of material data, and a timing to approximate location on a conveyor line;

recognizing a set of temperature sensor tags based on using at least one of: a trend indicative of a first predetermined gain in and a second predetermined dissipation, in temperature values sensed by the temperature sensor, and a bill of material data; and recognizing a set of input/output sensor tags based on using at least one of: a parameterization data associated with the input/output sensor tags and an OPC based standardized data format used in communication.

19. The non-transitory computer readable medium of claim 16 that stores thereon computer-executable instructions that in response to execution by a processor, perform operations further comprising: recognizing a set of VFD tags based on identifying a pattern in at least one of: a power value, an energy value, a voltage value, a current value, and a bill of material data associated with the VFD.

20. The non-transitory computer readable medium of claim 15 wherein each tag of the plurality of tags is associated with at least one of: the electronic component and a data entity associated with the electronic component and wherein the plurality of tags are used to perform communication based on one of: an open proprietary communication (OPC) and open standard communication protocol (OSP).

* * * * *